(12) United States Patent
Li

(10) Patent No.: US 8,203,301 B2
(45) Date of Patent: Jun. 19, 2012

(54) TEMPERATURE MONITORING SYSTEM FOR THE ENTIRE REGION OF ENVIRONMENT

(76) Inventor: Lung-Tsai Li, Taichung (TW)

( * ) Notice: Subject to any disclaimer, the term of this patent is extended or adjusted under 35 U.S.C. 154(b) by 445 days.

(21) Appl. No.: 12/457,400

(22) Filed: Jun. 10, 2009

(65) Prior Publication Data

US 2010/0299098 A1    Nov. 25, 2010

(30) Foreign Application Priority Data

May 25, 2009  (TW) .............................. 98117373 A

(51) Int. Cl.
*H02P 8/00*  (2006.01)

(52) U.S. Cl. .................. 318/696; 318/685; 318/641

(58) Field of Classification Search ............... 318/696, 318/685, 641; 340/522
See application file for complete search history.

(56) References Cited

U.S. PATENT DOCUMENTS

| 7,068,177 B2* | 6/2006 | Tice ............................... 340/630 |
| 2002/0030461 A1* | 3/2002 | Chian .......................... 318/696 |
| 2007/0146149 A1* | 6/2007 | Abe et al. ...................... 340/622 |

* cited by examiner

*Primary Examiner* — Karen Masih
(74) *Attorney, Agent, or Firm* — Rosenberg, Klein & Lee

(57) ABSTRACT

A temperature monitoring system consists of a multielement thermopile, an analog-to-digital converter (ADC), first and second microcontrollers (MCUs), a first stepping motor, a second stepping motor, a plurality of microswitches and a monitoring apparatus. The multielement thermopile is connected to the ADC linked with the first MCU, and the first MCU is further connected to the first stepping motor with microswitches for vertical motion control, and the second stepping motor with microswitches for horizontal motion control. At the same time the first MCU can be connected to the second MCU and the second MCU is linked with the monitoring apparatus. A hot spot occurring in electrical heating equipment or a smoldering source hidden in upholstery can be identified and proper measures can be performed, in case of extremely high temperature, so as further to prevent a fire.

7 Claims, 5 Drawing Sheets

TEMPERATURE MONITORING SYSTEM FOR THE ENTIRE REGION OF ENVIRONMENT

BACKGROUND OF THE INVENTION

1. Field of the invention

The present invention relates to a temperature monitoring system for the entire region of environment, particularly to a novel temperature monitoring system for the entire region of environment, which can monitor a hot spot occurring in electrical heating equipment or a smoldering source hidden in upholstery to take proper measures or actions as early as possible, in case of extremely high temperature, so as further to prevent the fire from taking place. It can increase more practical value in the integral implementation and usage thereof.

2. Brief Description of the Prior Art

The temperature of a fire varies gradually during initial stages of its breakout. Hence, a smoldering source generally goes unnoticed as wooden material is being warmed. Any unusual increase in the temperature of an object indicates a potential fire hazard. Therefore, long-term detection of variations in temperatures of indoor environment is imperative for predicting fires.

Conventionally, a method for monitoring indoor objects based on detecting an object's radiation in the infrared (IR) spectrum has been proposed. Experimental results obtained in study confirm the feasibility of using a pyroelectric infrared sensor for noncontact temperature measurement; however, an optical chopper, which involves a complicated mechanism, is needed in the system so as to obtain stable measurement. The complicated mechanism results in the surging of fabricating cost. Moreover, it can perform only one spot measurement so that this will cause inconvenience in implementation.

Additionally, a plane temperature monitoring system is also proposed, in which a multielement thermopile (TP) is adapted for monitoring the temperature of a given plane. This system is simpler and less expensive in its whole structure design, and suitable for online, real-time, and long-term temperature monitoring; however, it can monitor only two-dimensional and fixed-plane temperatures. Thus, it has less convenience in the integral implementation and usage thereof.

In view of the above facts, inventor of the present invention provides a novel temperature monitoring system for the entire region of environment according to the research and improvement conducted on the shortcomings of the existing structure based on his abundant experience of R&D and manufacturing in relevant field so as to achieve the goal of obtaining better practical value in application.

SUMMARY OF THE INVENTION

The temperature monitoring system for the entire region of environment according to the present invention essentially comprises a multielement thermopile (TP) connected to a AD converter (ADC) which is linked with the first microcontroller (MCU), and then the first MCU is further connected to the stepping motor for vertical motion control, the stepping motor for horizontal motion control, and several microswitches. Further, the first MCU and the second MCU is linked together and the second MCU is linked with the monitoring apparatus. Accordingly, it is possible to identify a hot spot occurring in electrical heating equipment or a smoldering source hidden in upholstery. Thus, it is suitable for on-line and long-term temperature monitoring and it can detect indoor temperature through wireless sensor network application. In case of extremely high temperature, detection by the system can help to take proper measures or actions as early as possible so as further to prevent the fire from taking place. It can increase more practical value in the integral embodiment and usage thereof.

DETAILED DESCRIPTION OF PREFERRED EMBODIMENTS

The objects, the technical contents and the expected effectiveness of the present invention will become more apparent from the detailed description of the preferred embodiment in conjunction with the accompanying drawings.

Figure 1:
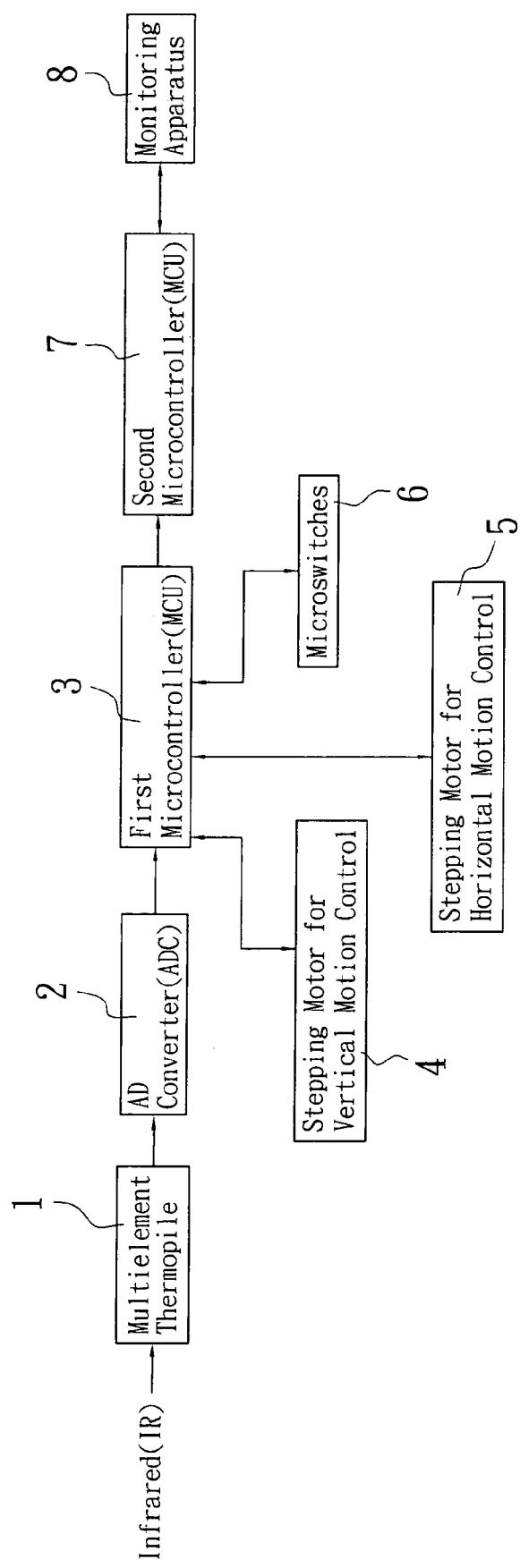
FIG. 1 is a block diagram showing the temperature monitoring system for the entire region of environment of the present invention.
Figure 2:
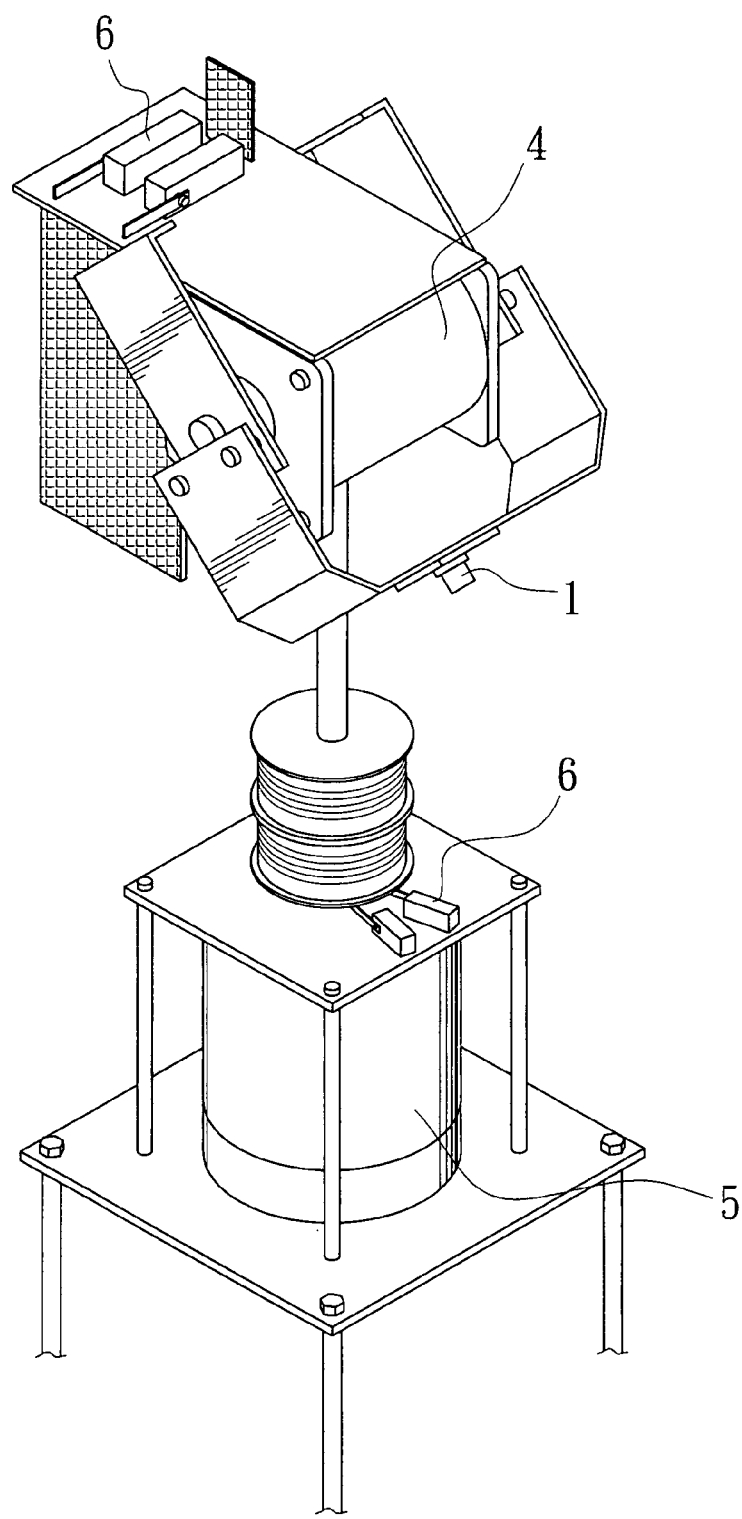
FIG. 2 is a schematic view showing the structure of the temperature monitoring system for the entire region of environment of the present invention.

FIG. 1 is a block diagram showing the structure of the present invention, FIG. 2 is a schematic view showing the structure of the present invention. As shown in the figures, this invention essentially consists of a multielement thermopile (1) connected to a AD converter (ADC) (2) which is linked with the first microcontroller (MCU) (3), and then the first MCU (3) is further connected to the stepping motor (4) for vertical motion control, the stepping motor (5) for horizontal motion control, and several microswitches (6); further, the first MCU (3) is connected to the second MCU (7) by an RS-232 interface and the second MCU (7) is linked with the monitoring apparatus (8) by an RS-232 interface or by wireless mode, wherein:

The multielement TP (1) can detect temperature according on the basis of IR absorption; it is a 1×8 element linear array sensor combined with an optical lens, amplifier, and interface electronics in a compact housing, the effective detection range is from −20° C. to 180° C., and the field of view (FOV) is 6°×41°.

Figure 3:
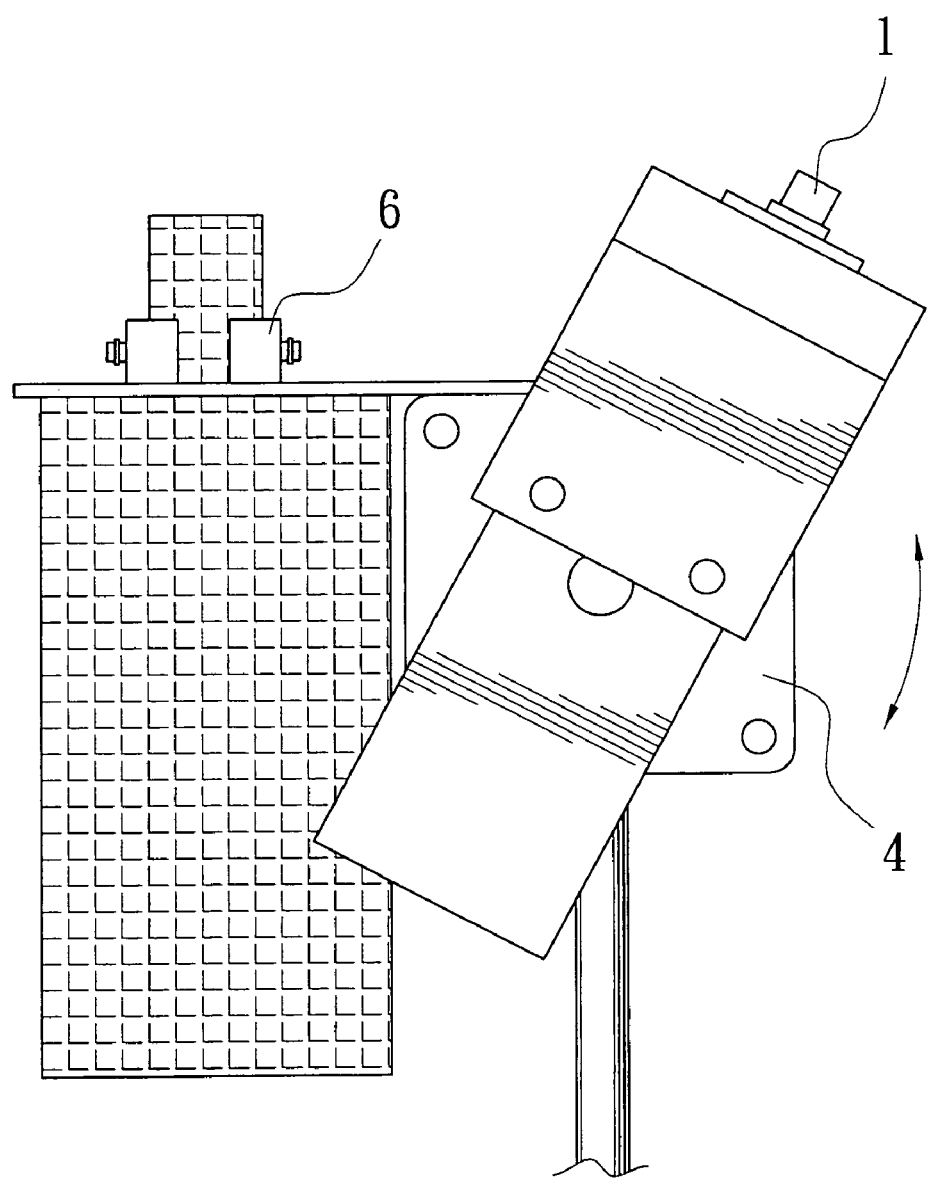
FIG. 3 is a view showing the vertically using state of the present invention.
Figure 4:
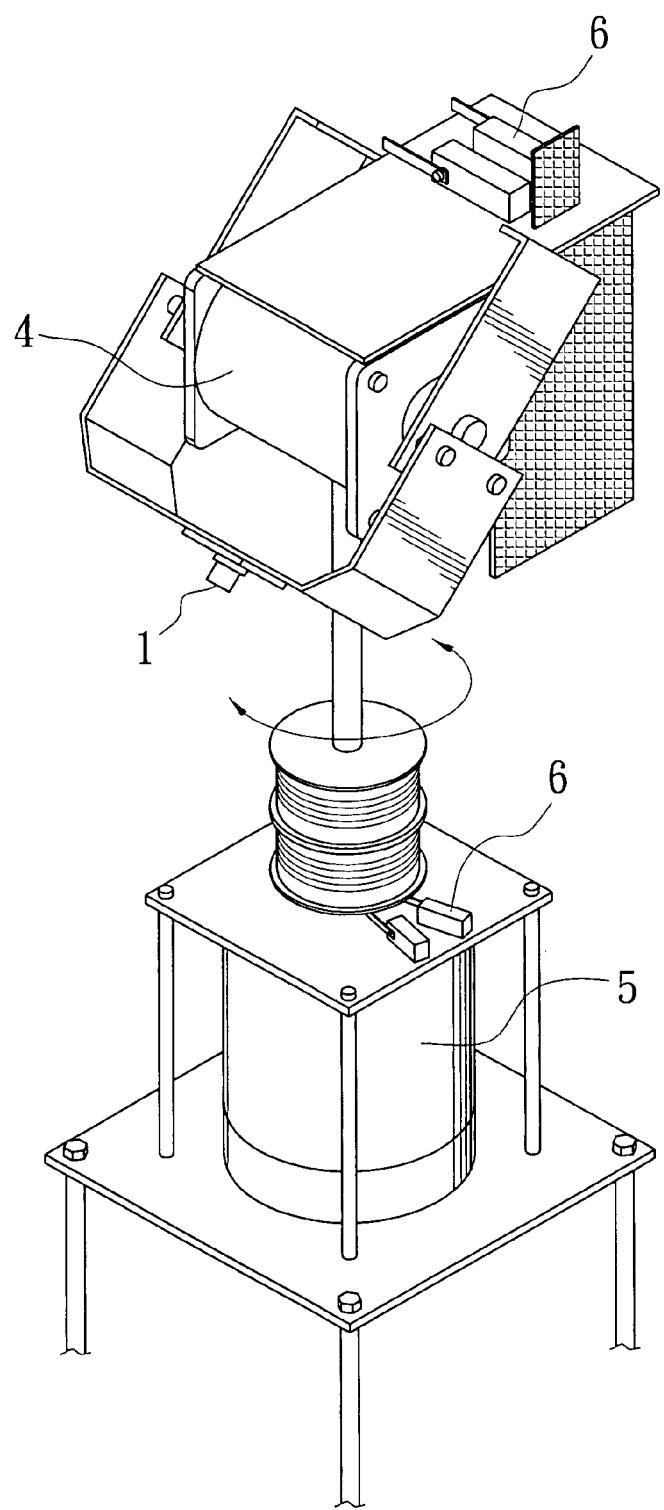
FIG. 4 is a view showing the horizontally using state of the present invention.
Figure 5:
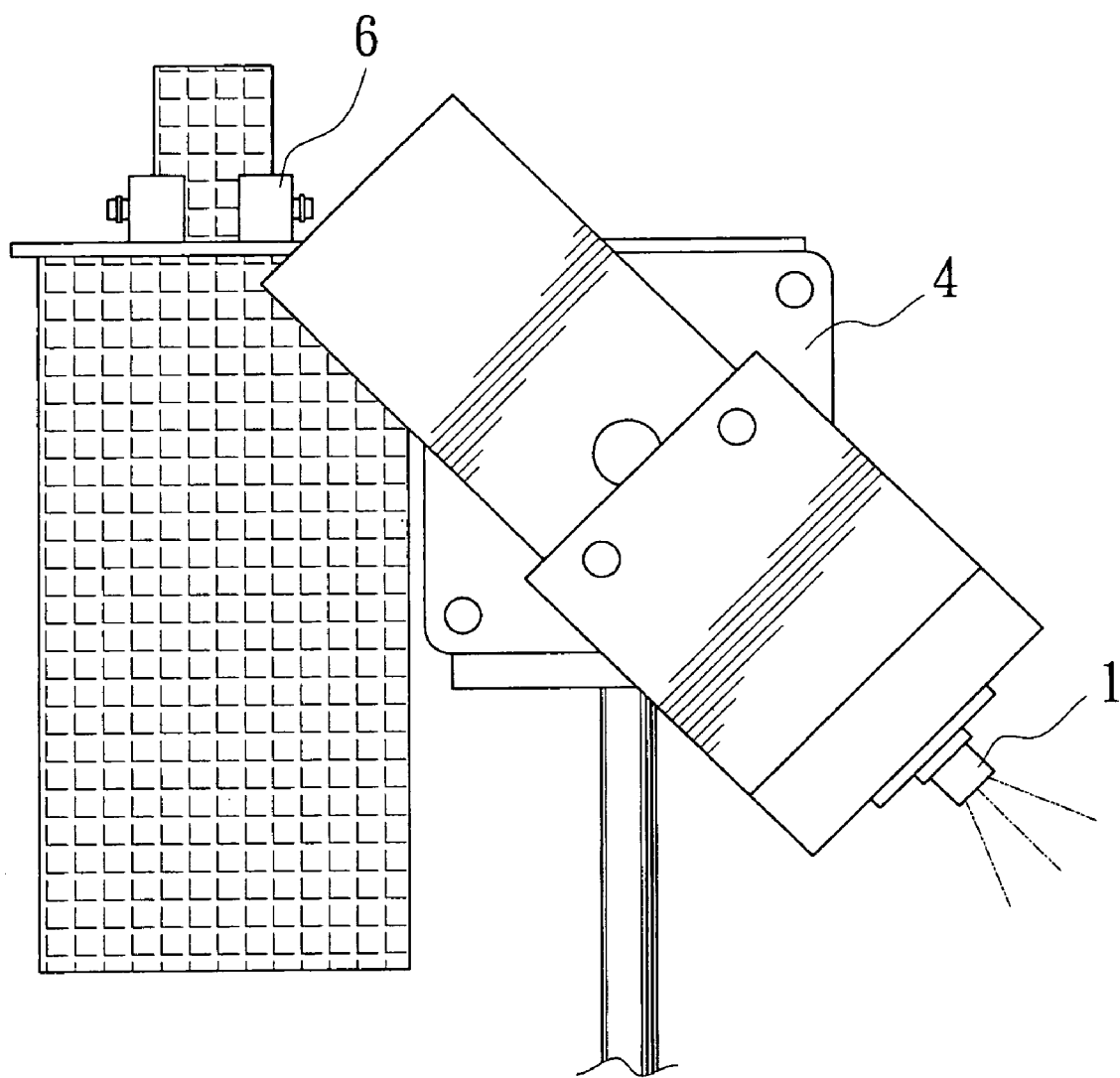
FIG. 5 is a view showing the using state of the present invention for detecting temperatures.

With this structure, in the implementation of the present invention, the stepping motor (4) for vertical motion control will moves the multielement TP (1) to conduct vertical motion as shown in FIG. 3 showing the vertically using state of the present invention, while the stepping motor (5) for horizontal motion control will moves the multielement TP (1) to conduct horizontal motion as shown in FIG. 4 showing the horizontally using state of the present invention, and the microswitches (6) are used to limit the angle of vertical or horizontal motion of the multielement TP (1). Thus, the multielement TP (1) can detect temperatures according to IR absorption of object, as shown in FIG. 5 showing the using state for temperature detection of the present invention. After the temperatures detected by the multielement TP (1) are converted into digital data files by the ADC (2), the first MCU (3) transmits the temperature signals together with data of the angles and directions of the stepping motor (4) for vertical motion control and the stepping motor (5) for horizontal motion control through the RS-232 interface to the second MCU (7). Then, the signals received and treated by the second MCU (7) are transmitted to the monitoring apparatus (8) by the interface RS-232 or by wireless mode so as to display the monitored object temperatures on the monitoring apparatus (8). The temperature computation step concerning the monitored temperatures depends on emissivity, precalibrated data, and the ADC value in order to compute the real temperature precisely.

While the preferred embodiment has been described in conjunction with the accompanying drawings, it is to be understood that the embodiment and the illustration are not restrictive to the product structure or application mode. Variations and modifications made by the person skilled in the art without departing from the spirit and scope of the present invention are still considered to be within the scope of the present invention.

It is understood from the above description based on the structure and embodiment of the present invention, when comparing with conventional structure, the present invention essentially comprises a multielement thermopile connected to the ADC linked with the first MCU, and then the first MCU is further connected to the first stepping motor for vertical motion control, the second stepping motor for horizontal motion control and several microswitches, at the same time the first MCU is connected to the second MCU and the second MCU is linked with the monitoring apparatus. Accordingly, it is possible to identify a hot spot occurring in electrical heating equipment or a smoldering source hidden in upholstery. Thus, it is suitable for on-line and long-term temperature monitoring and it can detect indoor temperature through wireless sensor network application. In case of extremely high temperature, detection by the system can help to take proper measures or actions as early as possible so as further to prevent the fire from taking place. Therefore, it can increase more practical value in the integral embodiment and usage thereof.

Summing up above, the embodiments of this invention can reach expected effectiveness, and the specific configurations disclosed herein have yet not seen in the prior art of the same category of product, even has not been opened to the public before application.

What is claimed is:

1. A temperature monitoring system for the entire region of environment, comprising a multielement thermopile connected to an analog to digital converter, ADC, linked with a first microcontroller unit, MCU, and then the first MCU being further connected to the first stepping motor for vertical motion control, the second stepping motor for horizontal motion control and several microswitches, at the same time the first MCU being connected to the second MCU and the second MCU being linked with a monitoring apparatus;
    wherein said multielement thermopile is a 1×8 element linear array sensor combined with an optical lens, amplifier, and interface electronics in a compact housing.

2. A temperature monitoring system for the entire region of environment in accordance with claim 1, wherein said first MCU is linked with said second MCU by an RS-232 interface.

3. A temperature monitoring system for the entire region of environment in accordance with claim 1, wherein said second MCU is linked to said monitoring apparatus by a RS-232 interface.

4. A temperature monitoring system for the entire region of environment in accordance with claim 1, wherein said second MCU is linked to said monitoring apparatus by wireless mode.

5. A temperature monitoring system for the entire region of environment in accordance with claim 1, wherein the effective temperature detection range of said multielement thermopile is from −20° C. to 180° C.

6. A temperature monitoring system for the entire region of environment in accordance with claim 1, wherein the field of view of said multielement thermopile is 6°×41°.

7. A temperature monitoring system for the entire region of environment in accordance with claim 1, wherein the temperature computation step concerning the monitored temperature displayed on said monitoring apparatus depends on emissivity, precalibrated data, and the ADC value in order to compute the real temperature precisely.

* * * * *